United States Patent
Jing et al.

(10) Patent No.: US 11,316,391 B2
(45) Date of Patent: Apr. 26, 2022

(54) CLOSED-LOOP CONTROL FOR TRANSIENT OPERATION OF VARIABLE FLUX AND PERMANENT MAGNET ELECTRIC MACHINES

(71) Applicant: GM GLOBAL TECHNOLOGY OPERATIONS LLC, Detroit, MI (US)

(72) Inventors: Xin Jing, Rochester, MI (US); Bojian Cao, Troy, MI (US); Brent S. Gagas, Ferndale, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 283 days.

(21) Appl. No.: 16/806,354

(22) Filed: Mar. 2, 2020

(65) Prior Publication Data
US 2021/0273505 A1   Sep. 2, 2021

(51) Int. Cl.
*H02K 1/276* (2022.01)
*H02M 7/48* (2007.01)
*H02K 1/24* (2006.01)

(52) U.S. Cl.
CPC .......... *H02K 1/2766* (2013.01); *H02K 1/246* (2013.01); *H02M 7/48* (2013.01)

(58) Field of Classification Search
CPC ....... H02K 1/2766; H02K 1/246; H02M 7/48; H02P 29/60; H02P 21/0089
See application file for complete search history.

(56) References Cited

U.S. PATENT DOCUMENTS

| | | | |
|---|---|---|---|
| 8,562,471 B2 | 10/2013 | Savagian et al. | |
| 9,077,227 B2 | 7/2015 | Theobald et al. | |
| 10,171,019 B1* | 1/2019 | Xu | H02P 9/06 |
| 10,541,578 B2 | 1/2020 | Swales et al. | |
| 2003/0151385 A1* | 8/2003 | Wu | H02P 21/16 318/727 |
| 2004/0257028 A1* | 12/2004 | Schulz | H02P 6/181 318/802 |
| 2015/0091483 A1* | 4/2015 | Osamura | H02P 21/18 318/400.25 |
| 2015/0130376 A1* | 5/2015 | Pace | H02P 21/0089 318/400.02 |
| 2017/0085202 A1* | 3/2017 | Yoo | H02P 21/14 |

* cited by examiner

*Primary Examiner* — Tulsidas C Patel
*Assistant Examiner* — Riley Owen Stout
(74) *Attorney, Agent, or Firm* — Quinn IP Law

(57) ABSTRACT

A method for controlling transient operation of a rotary electric machine in an electric powertrain or other electrical system includes, during a shunt angle transition occurring during a maximum torque per ampere (MTPA) control region, determining an estimated output torque of the electric machine via a torque estimation block using d-axis and q-axis current commands and an additional value, i.e., an actual shunt angle or a machine temperature. The method includes subtracting the estimated output torque from a commanded output torque to derive an adjusted commanded torque value or torque error, and calculating, from the torque error, a delta d-axis current command and a delta q-axis current command. The method includes adjusting d-axis and q-axis current commands using the delta commands to produce adjusted d-axis and q-axis current commands, which are then used as closed-loop feedback control terms by the torque estimation block.

20 Claims, 5 Drawing Sheets

CLOSED-LOOP CONTROL FOR TRANSIENT OPERATION OF VARIABLE FLUX AND PERMANENT MAGNET ELECTRIC MACHINES

INTRODUCTION

Rotary electric machines are used to provide torque in a wide variety of electromechanical systems. In a typical radial flux machine, for instance, a cylindrical rotor is circumscribed by a cylindrical stator having a set of stator field windings. The rotor and an integrally connected rotor shaft rotate in unison when the stator field windings are sequentially energized by a high-voltage power supply, typically in the form of a power inverter module and a multi-cell battery pack. Torque generated by machine rotation is then transmitted to a coupled load to perform work such as generating electricity, cranking and starting an internal combustion engine, or powering road wheels, propeller blades, or other driven loads depending on the application.

In a permanent magnet (PM) machine, strong permanent magnets are surface-mounted to or embedded within individual ferrous laminations of the rotor. The permanent magnets are arranged to form alternating magnetic north and south poles around the rotor's circumference. The rotating stator field interacts with strong magnetic fields of the permanent magnets to rotate the rotor shaft. External control of an input voltage delivered to the individual stator windings ultimately controls the speed and torque produced by the PM machine. An energized PM machine generates a back-electromotive force (back-EMF) as a voltage opposing that of the energized stator windings. Therefore, PM machine operation is often controlled using field weakening techniques that reduce the back-EMF of the electric machine at higher rotational speeds. In contrast to a PM machine, a variable flux machine (VFM) foregoes use of the above-noted permanent magnets. A VFM is able to provide a relatively high output torque while at the same time operating with high energy efficiency, while PM machines tend to experience higher energy losses under high-speed/low-load operating conditions.

Magnetic flux may be varied within flux paths of a rotary electric machine to vary the back-EMF of the electric machine, for instance by using machine demagnetization or magnetization, mechanical flux-shunting elements, or the above-noted field weakening techniques. A typical VFM, for instance, may change a position or angle (shunt angle) of hardware devices embedded within the electric machine to impart a purposeful change of direction in the magnetic flux passing through a magnetic field circuit or shunt field. Field weakening techniques in VFM or PM machines have the ultimate effect of reducing the stator field current and back-EMF of the electric machine.

SUMMARY

Disclosed herein are control strategies, control systems, and associated control logic for controlling a transient response of a rotary electric machine. In particular, the present disclosure provides closed-loop/feedback-based control solutions for the purpose of improving the overall speed and accuracy of a torque transient response in a variable flux machines (VFM), with the present teachings also being extendable to real-time control and thermal regulation of a permanent magnet (PM) machine using the simple temperature-based substitutions as described herein.

As will be appreciated by those of ordinary skill in the art, a computer-controlled system such as a rotary electric machine of the type treated herein will, in the course of ongoing operation, exhibit period of steady-state and transient operation. For instance, the output torque produced by an electric traction motor, when supplied with a constant voltage at a constant operating temperature, will eventually settle into a relatively predictable steady-state torque. Steady-state performance is thus usually available in the form of calibrated torque-speed curves for a particular electric machine used in a given application. The steady-state torque response of an electric machine may be relied upon by associated motor control processors, hierarchical controllers, and associated control logic in order to power a driven load in a predictable and repeatable manner.

In contrast to the steady-state torque response, a transient torque response of an electric machine is the machine's time-variant response to one or more changed input conditions prior or subsequent to steady-state operation. Relatively slow and/or large torque transients can exacerbate noise, vibration, and harshness ("NVH") effects. For instance, an overly abrupt torque transient response in a motor vehicle having an electric powertrain driven by an electric traction motor may be perceived by an operator of the motor vehicle as a torque disturbance and, as a result, a degraded drive quality. The present control strategies thus seek to optimize the speed and accuracy of a torque transient response of rotary electric machines, including a VFM and a PM machine, with the proposed solutions and associated hardware being directed to such ends.

In an exemplary embodiment, a method for controlling transient operation of a rotary electric machine includes, during an MTPA control region of the electric machine determining an estimated output torque of the electric machine. This process step is performed by a torque estimation block of a controller using a d-axis current command, a q-axis current command, and an additional value. The additional value is an actual shunt angle or a temperature of the electric machine depending on the construction of the electric machine as noted below. The method includes subtracting the estimated output torque from a commanded output torque to thereby derive an adjusted commanded torque value or torque error, and calculating, using the adjusted commanded torque value or torque error, a delta d-axis current command and a delta q-axis current command.

Additionally, the method in this embodiment includes adjusting a d-axis current command and a q-axis current command of the electric machine, via the controller, using the delta d-axis current command and the delta q-axis current command, respectively. Ultimately, the controller provides the d-axis command and the q-axis command to the torque estimation block as closed-loop feedback control terms.

The rotary electric machine may be optionally embodied as a variable flux machine, in which case the additional value is the above-noted actual shunt angle. When the electric machine is a permanent magnet machine, the additional value is the temperature of the electric machine.

The method may include feeding a direct current bus voltage, a torque slew command, and a rotary speed of the electric machine into separate d-axis and q-axis command lookup tables of the controller, and adding the delta d-axis current command and the delta q-axis current command to respective outputs of the separate d-axis and q-axis command lookup tables to thereby derive the d-axis current command and the q-axis current command.

Calculating the delta d-axis and delta q-axis current commands may include processing the adjusted commanded torque value or torque error through a proportional-integral (PI) regulator to produce a delta steady-state current magnitude, adding the delta steady-state current magnitude to a steady-state current magnitude to produce a new steady-state current value, processing the new steady-state current value through an MTPA beta angle lookup table to produce a current command beta angle of the electric machine, and transforming the current command beta angle into adjusted d-axis and q-axis values using a transformation block of the controller.

The method may include selectively and automatically resetting the PI regulator in response to a predetermined condition.

During a field weakening control region of the electric machine occurring prior or subsequent to the MTPA control region, the method may include using a modulation index control loop of the controller to regulate the d-axis current command, and thereafter regulating the q-axis current command via the torque control loop of the controller.

A calibrated torque hysteresis band may be implemented by the controller to avoid oscillation or jittering between the MTPA control region and the field weakening control region.

Determining the estimated output torque may include using a flux lookup table to determine a respective d-axis and a q-axis flux contribution. The torque estimation block in such an embodiment includes a lookup table indexed by the d-axis current, the q-axis current, the d-axis flux contribution, and the q-axis flux contribution.

An electric powertrain is also disclosed herein having a rotary electric machine having phase windings, a traction power inverter module (TPIM) connected to the rotary electric machine via the phase windings, and an automatic control system or controller. The controller in a possible embodiment has a current control block connected to the TPIM that is configured to receive d-axis and q-axis current commands, and in response to the d-axis and q-axis current commands, to output d-axis and q-axis voltage commands to the TPIM. The controller also includes shunt control block configured to transition an actual shunt angle of the electric machine during an MTPA control region of the electric machine to thereby modify flux paths within and back-EMF of the electric machine.

The controller in this embodiment is configured to execute instructions to thereby control a transient operation of the rotary electric machine, which causes the control system, during the shunt angle transition, to determine an estimated output torque of the rotary electric machine, via a torque estimation block, using a d-axis current command, a q-axis current command, and an additional value. As noted above, the additional value may be an actual shunt angle of the electric machine, when the electric machine is a variable flux machine, or a temperature of the electric machine when the electric machine is a permanent magnet machine.

The controller is configured to subtract the estimated output torque from a commanded output torque to thereby derive an adjusted commanded torque value or torque error, as well as to calculate, from the adjusted commanded torque value or torque error, a delta d-axis current command and a delta q-axis current command. The controller also adjusts an actual d-axis current command and an actual q-axis current command of the electric machine using the delta d-axis command and the delta q-axis command, respectively, to thereby produce the d-axis command and the q-axis command. The controller then provides the d-axis and q-axis commands as closed-loop feedback control terms to the torque estimation block.

The above-noted and other features and advantages of the present disclosure will be readily apparent from the following detailed description of the embodiments and best modes for carrying out the disclosure when taken in connection with the accompanying drawings and appended claims.

Figure 1:
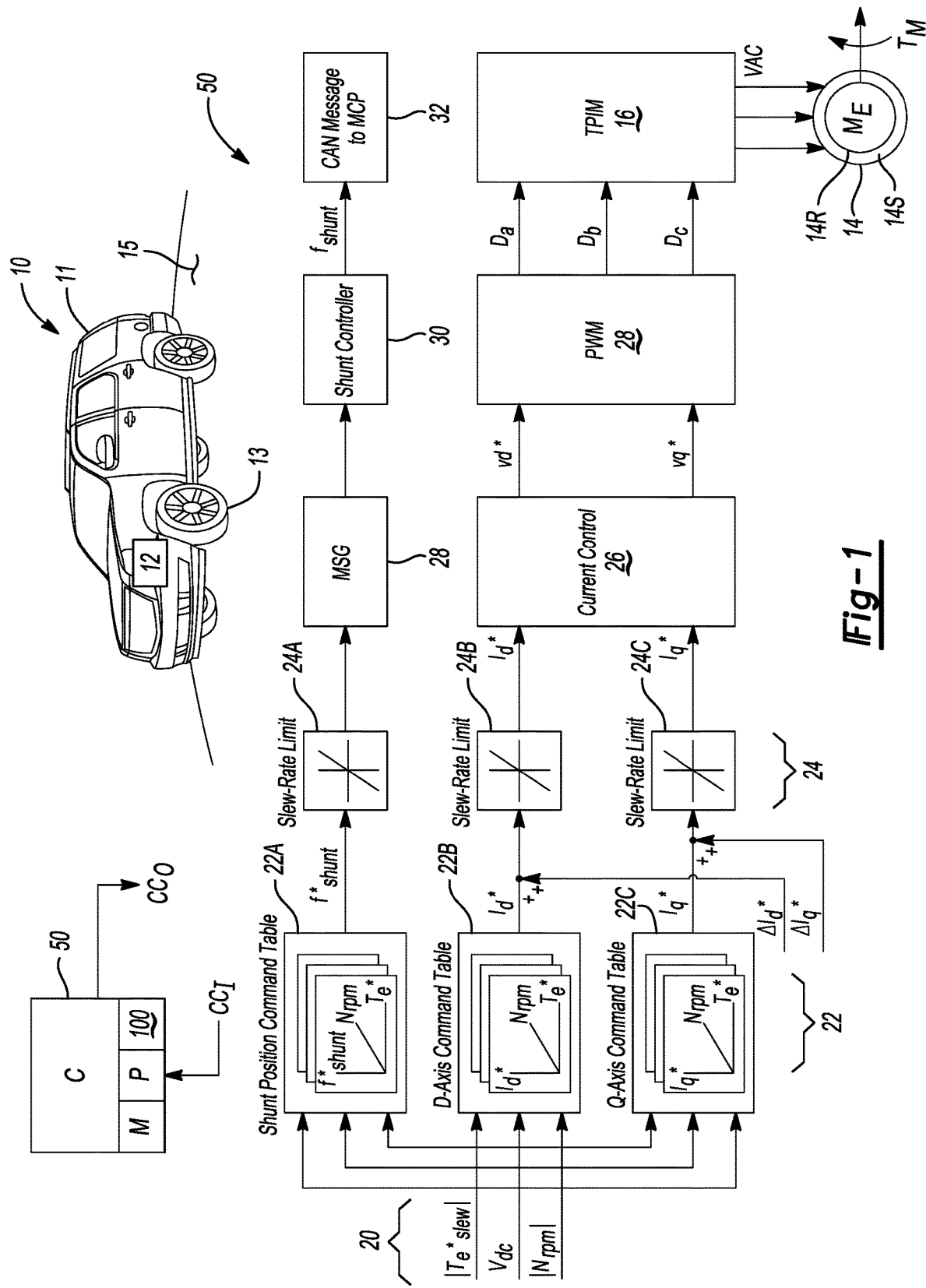
FIG. 1 is a schematic illustration of a motor vehicle having an electric powertrain with a rotary electric machine and a closed-loop/feedback control system configured as set forth herein.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover modifications, equivalents, combinations, and alternatives falling within the scope and spirit of the disclosure as defined by the appended claims.

DETAILED DESCRIPTION

The present disclosure is susceptible of embodiment in many different forms. Representative examples of the disclosure are shown in the drawings and described herein in detail, with the understanding that the described embodiments are provided as exemplifications of the disclosed principles as opposed to limitations of the broad aspects of the disclosure. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

Referring to the drawings, wherein like reference numbers refer to like components, FIG. 1 schematically depicts a motor vehicle 10 having a vehicle body 11, an electric powertrain 12, and one or more road wheels 13 in rolling contact with a road surface 15. Although omitted for the purpose of illustrative simplicity, the electric powertrain 12 also includes an onboard power supply, such as a high-voltage direct current (DC) battery pack having an application-suitable number of high-energy rechargeable battery cells, for instance lithium ion battery cells or cells constructed of another suitable battery chemistry.

A battery pack of this type is discharged in a controlled manner in order to energize phase windings of a rotary electric machine (ME) 14, which in turn may be embodied as a variable flux machine (VFM) or a permanent magnet (PM) machine in accordance with the representative embodiments described herein. The electric machine 14 may be optionally configured as an electric traction motor for use as a primary torque source in the electric powertrain 12, with the electric machine 14 in such a configuration being operable for generating motor torque (arrow $T_M$) at levels sufficient for propelling the motor vehicle 10 or as an electrical generator for recharging the above-noted battery pack.

The motor vehicle 10 may also include additional torque sources not specifically described herein, e.g., an internal combustion engine and/or additional electric machines 14, and therefore the representative embodiment of FIG. 1 is intended to be illustrative of the present teachings and non-limiting. Beneficial applications of the electric machine 14 are not limited to mobile applications in general or to vehicular propulsion applications in particular. Those of ordinary skill in the art will appreciate that the attendant benefits of the disclosed electric machine 14, when controlled using the strategies described below with reference to FIGS. 2-6, may be extended to stationary and mobile applications that rely on the use of motor torque (arrow $T_M$), e.g., watercraft, aircraft, rail vehicles, mobile platforms, robots, powerplants, washing machines or other appliances, or other stationary or mobile systems.

As a foundational basis for the present solutions, it is recognized herein that in the electric machine 14 of FIG. 1 includes a concentrically arranged rotor 14R and stator 14S of the types noted generally above. A magnetic circuit exists between laminated structure of the rotor 14R and stator 14S, across a small air gap between the rotor and stator, and possibly across small air pockets defined by the rotor. Flux paths within such a magnetic circuit are varied in certain constructions of the electric machine 14, e.g., the above-noted VFM, such as by selectively shunting the magnetic flux in a targeted manner at specific operating points, such as by moving or skewing phasing mechanisms or other shunting elements, for instance as set forth in U.S. Pat. No. 8,562,471B2 to Savagian et al., U.S. Pat. No. 9,077,227B2 to Theobald et al, and U.S. Pat. No. 10,541,578B2 to Swales et al., which are hereby incorporated by reference in their respective entireties, or other suitable shunting approaches without limitation. Passively or actively controlled skewing serves to increase or decrease the motor's torque capabilities, as will be appreciated by those of ordinary skill in the art. Thus, a commanded shunt angle is a particular control variable relied upon by an associated motor control unit in some types of electric machines, including the present electric machine 14, and with such a control unit shown schematically in FIG. 1 as a controller (C) 50.

The electric powertrain 12 in the illustrated embodiment includes a traction power inverter module (TPIM) 16 that is electrically connected to the battery pack (not shown) described above. ON/OFF conducting states of internal semiconductor switches (not shown) within the TPIM 16 are automatically controlled via pulse width modulation (PWM) or other modulation techniques via a PWM controller 28 in order to generate an alternating current output voltage (VAC) at levels suitable for energizing the electric machine 14.

The controller 50 of FIG. 1 may be used to regulate ongoing transient and steady-state operation of the electric machine 14 in response to input signals (arrow $CC_I$), with the controller 50 doing so via transmission of control signals (arrow $CC_O$) to the electric machine 14 and/or associated logic blocks thereof as set forth herein and illustrated in FIGS. 2-6. For example, the controller 50 may monitor the rotational speed and torque of the electric machine 14 using sensors (not shown), modeling, and/or calculations, and may selectively transition to a flux weakening control mode from a maximum torque per ampere (MTPA) mode at certain torque-speed operating points or as otherwise needed.

Figure 2:
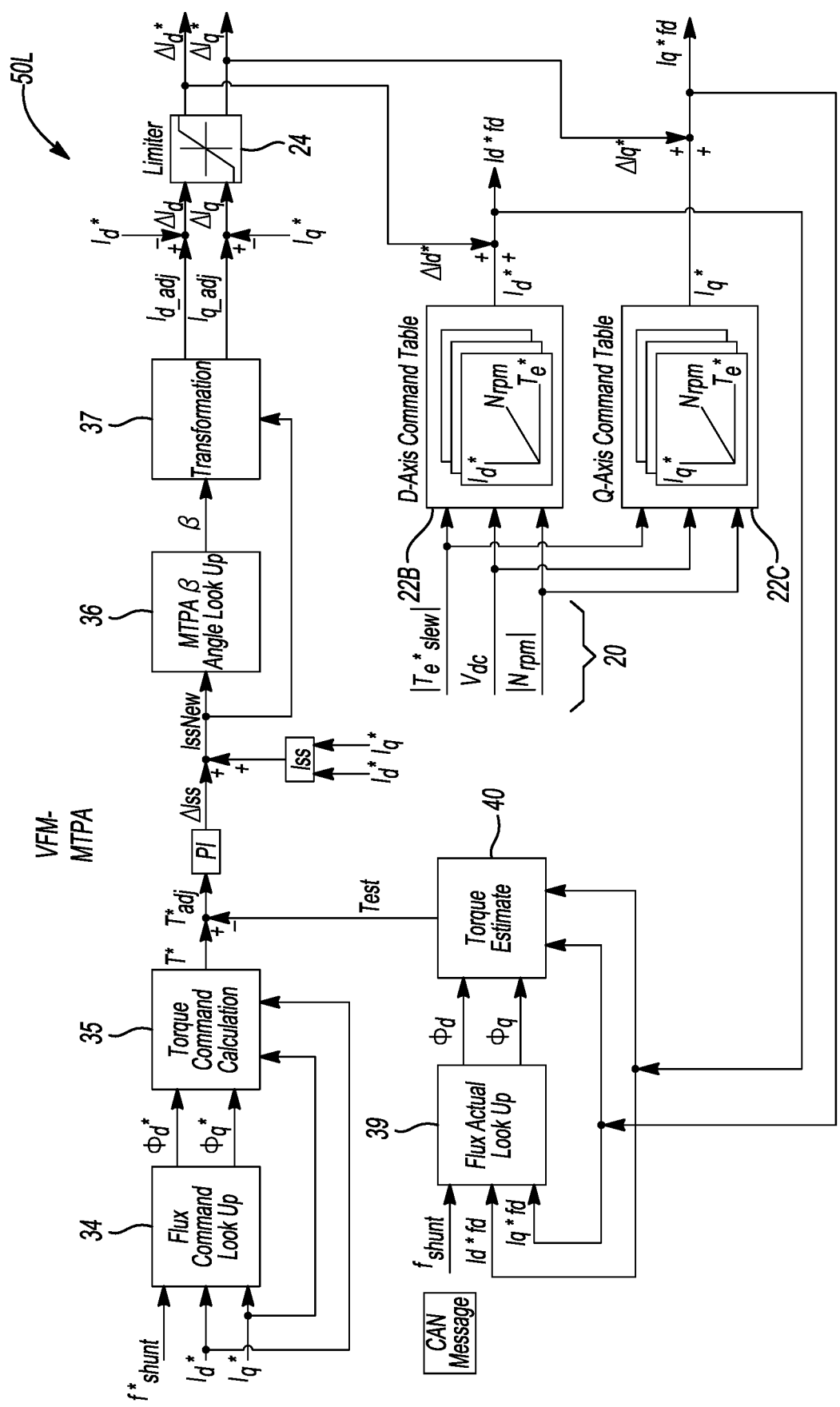
FIG. 2 is a schematic logic diagram of transient torque control of an exemplary variable flux machine (VFM) when operating in a maximum torque per ampere (MTPA) control region.
Figure 3:
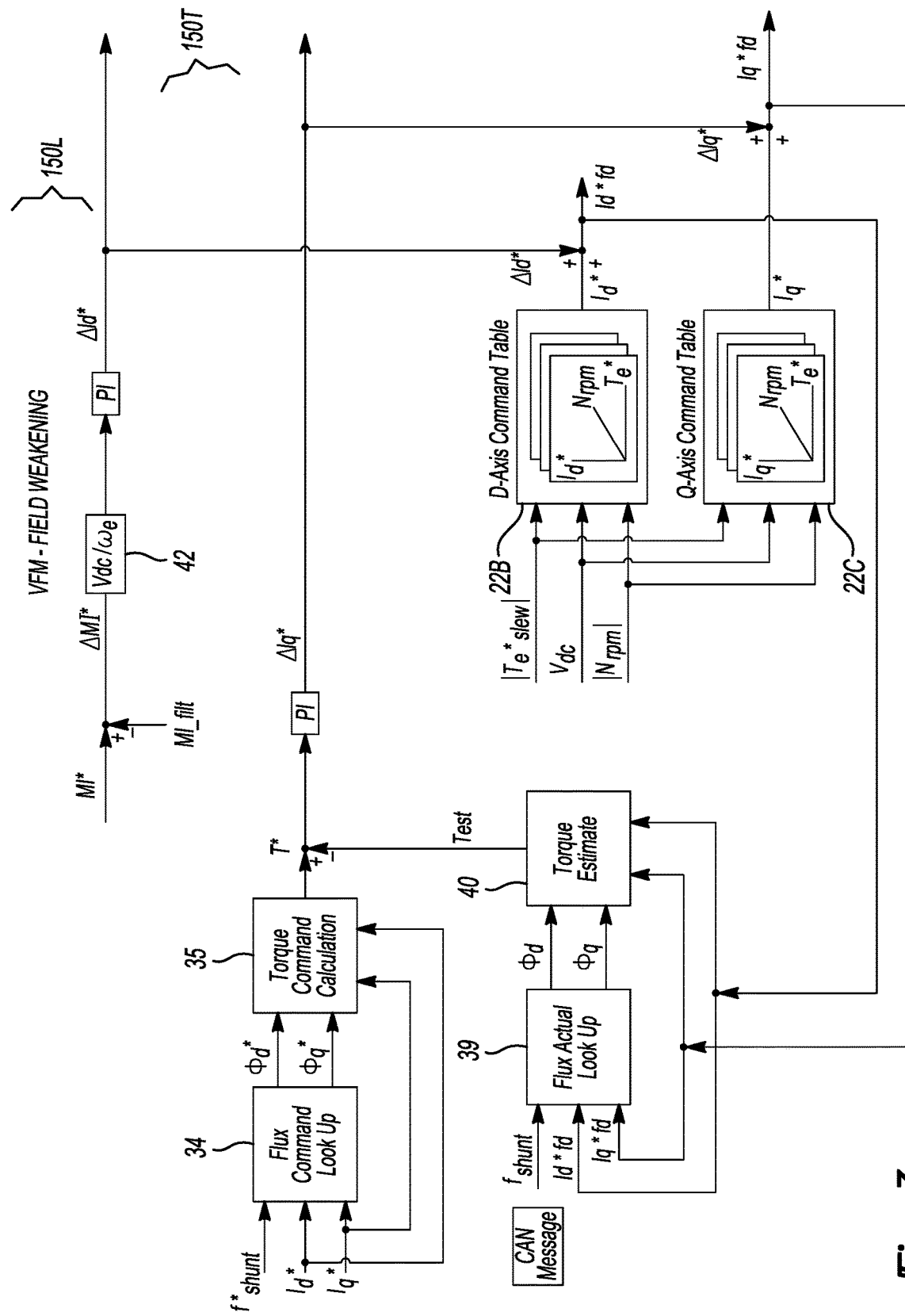
FIG. 3 is schematic logic diagram of transient torque control of an exemplary VFM when operating in a field weakening control region.
Figure 4:
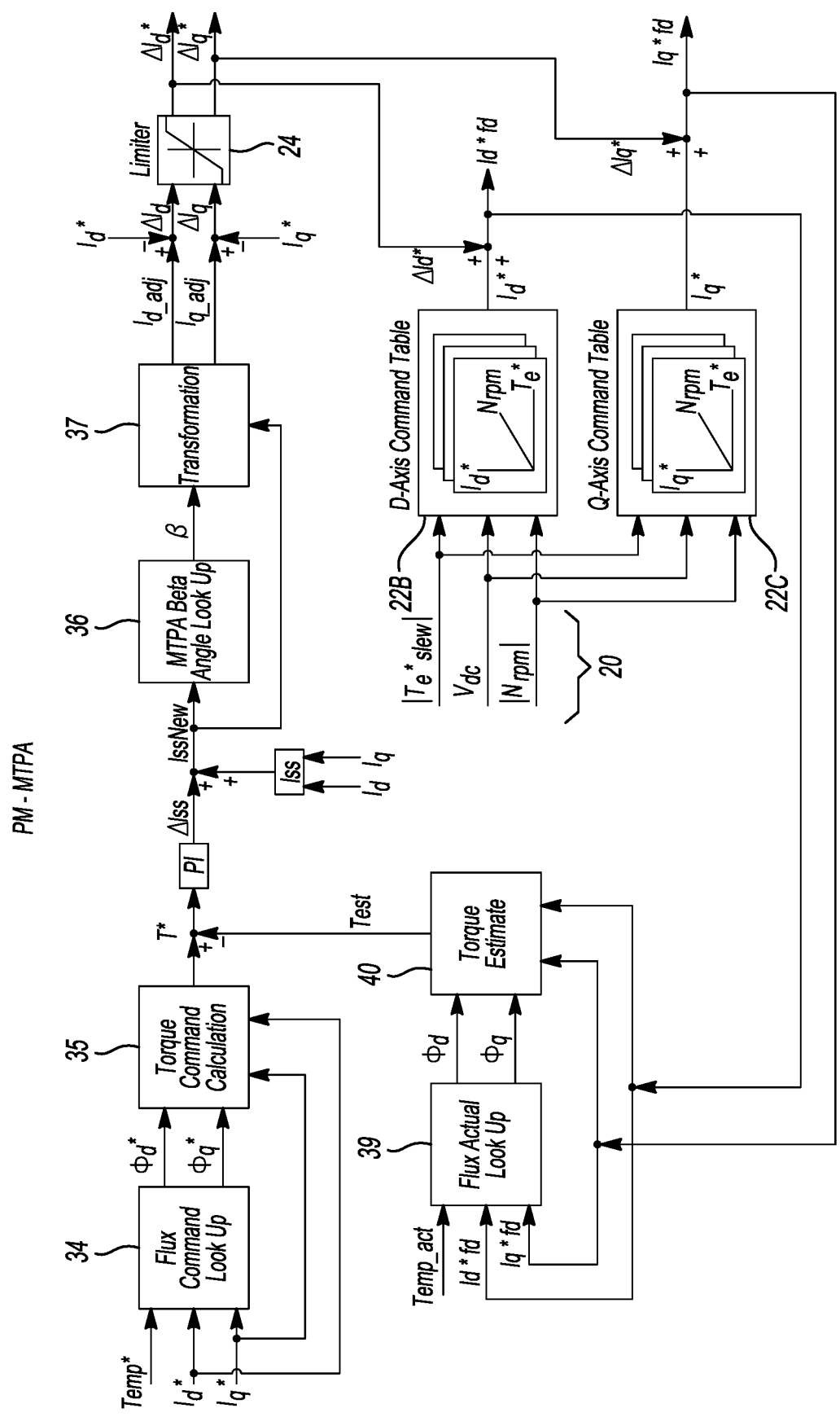
FIG. 4 is a modified embodiment of the schematic logic diagram shown in FIG. 2 providing optional thermal adaption for a permanent magnet (PM) machine operating in the MTPA control region.

The controller 50 described herein with reference to associated logic blocks of FIGS. 2-4 may be physically embodied as one or more electronic control units or computer nodes each having the requisite memory (M) and a processor (P), as well as other associated hardware and software, e.g., a clock or timer, input/output circuitry, buffer circuitry, etc. Memory (M) may include sufficient amounts of read only memory, for instance magnetic or optical memory. Instructions embodying a control method may be programmed as computer-readable instructions 100 into the memory (M) and executed by the processor(s) (P) during operation of the vehicle 10 to thereby optimize operating efficiency. The term "controller" is used herein for simplicity, and includes control modules, units, processors, and permutations thereof, including logic circuits, Application Specific Integrated Circuits (ASICs), electronic circuits, central processing units, microprocessors, and other hardware as needed to provide the programmed functionality set forth below.

Still referring to FIG. 1, core hardware and programmed memory elements of the controller 50 are used, as noted generally hereinabove, to control steady-state operation of the electric machine 14 as well as to regulate operation of the electric machine 14 during a transient response. For instance, the schematically-depicted control logic of FIG. 1 may be used during steady-state operation of an optional VFM embodiment of the electric machine 14. As part of the input signals (arrow $CC_I$), for instance, the controller 50 may receive motor control inputs 20, shown as a motor torque slew command, $|T_e^*slew|$, with the slew rate defined herein as a commanded rate of change per unit time of torque commands. The motor control inputs 20 also include the current DC bus voltage ($V_{DC}$) feeding the TPIM 16 and the electric machine 14, and a measured or actual/reported speed $|N_{RPM}|$ of the rotor 14R.

The motor control inputs 20 are fed into calibrated lookup tables 22, i.e., lookup tables 22A, 22B, and 22C, each of which is programmed into or accessible by the controller 50 and indexed by the torque slew command, rotary speed, and DC bus voltage. In the illustrated embodiment, lookup table 22A provides a corresponding shunt angle command ($f^*_{shunt}$), lookup table 22B provides a corresponding direct-axis (d-axis) current command ($I_d^*$), and lookup table 22C provides a corresponding quadrature-axis (q-axis) command ($I_q^*$).

Still referring to FIG. 1, the output values from lookup tables 22B and 22C are added to respective d-axis and q-axis feedback control terms, referred to herein as delta current command values $\Delta I_d^*$ and $\Delta I_q^*$, with the asterisk superscript (*) indicating a commanded value, which in turn are determined in one of the particular manners depicted in FIGS. 2-4. Such values may be rate-limited to within a calibrated allowable maximum/minimum slew rate using a corresponding limit block 24 ("Limit"), e.g., limit blocks 24A, 24B, and 24C. The corrected and slew rate-limited d-axis and q-axis current commands $I_d^*$ and $I_q^*$ are then fed into a current control block 26 ("Current Control"), colloquially referred to as a "current controller", with the current control block 26 being configured to calculate corresponding d-axis and q-axis voltage commands $v_d^*$ and $v_q^*$, respectively.

The d-axis and q-axis voltage commands $v_d^*$ and $v_q^*$ being output by the current control block 26 are thereafter used by the controller 50 in a modulation process, e.g., by feeding the d-axis and q-axis voltage commands into a PWM control block 28, which in turn outputs a, b, and c phase switching commands (Da, Db, Dc) to the TPIM 16. In response, the TPIM 16 controls the ON/OFF states of semiconductor switches housed therein, as will be appreciated by those of ordinary skill in the art, with the TPIM thereafter outputting the polyphase voltage (VAC) to the electric machine 14 to thereby power a connected driven load, such as the road wheels 13.

In the exemplary steady-state control logic depicted in FIG. 1, a slew rate-limited shunt position command from limit block 24A may be fed into a messaging block ("MSG") 28. For example, the controller 50 may receive and transmit messages aboard the motor vehicle 10 using a controller area network (CAN) or another message-based protocol. Messaging block 28 is thus configured to convert the CAN messages into suitable transmission controls commands as needed. Corresponding control signals are then provided to a shunt control block ("Shunt Controller") 30, i.e., a logic block and associated hardware configured to adjust the shunt angle of shunt elements or mechanisms used within the electric machine 14. The shunt control block 30 is also configured to measure and report an actual shunt position ($f_{shunt}$), e.g., using an angular encoder or other suitable position sensor. The actual shunt position is relayed to the rotary electric machine 14 by a communications relay block 32, e.g., to a motor control processor or MCP residing within the electric machine 14, for instance as a CAN message ("CAN Message to MCP"). As will be appreciated, the shunt control block 30 may reside within the same control unit as the rest of the logic, in which case there is no need for the above-described CAN messaging.

Referring to the schematically-depicted control logic 50L of FIG. 2, which may be used to control a torque transient response of the rotary electric machine 14 when the electric machine 14 is embodied as a VFM, the control logic 50L in such an embodiment is used to control the electric machine 14 during operation in a maximum torque per ampere (MTPA) control region. As will be appreciated by those of ordinary skill in the art, resistive losses within the stator 14S of the electric machine 14 shown in FIG. 1 depend on the magnitudes of the phase currents being fed into the individual stator windings. Thus, operation in the MTPA control region strives to maximize the output torque (arrow $T_M$) of the electric machine 14 at a given current magnitude. As the shunt angle changes, so too will the back-EMF in the electric machine 14, which in turn causes a change to occur in the output torque (arrow $T_M$ of FIG. 1). The control logic 50L of FIG. 2 when used in the MTPA region of control may therefore help expedite the overall transient response time and smooth possible torque disturbances.

As shown in FIG. 2, the control logic 50L includes a torque estimation block 40 ("Torque Estimate") configured to determine an estimated torque ($T_{est}$) from the electric machine 14 using feedback current commands $I_d^*$fd and $I_q^*$fd, which are the actual d-axis and q-axis current commands shown at far right in FIG. 2, and also using the actual shunt angle ($f_{shunt}$) of the electric machine 14. Ultimately, the d-axis/q-axis current commands to the electric machine 14 are adjusted by the controller 50 based on the actual and commanded shunt angles $f_{shunt}$ and $f^*_{shunt}$, respectively.

In particular, the controller 50 is configured to receive or otherwise determine the above-described commanded shunt angle ($f^*_{shunt}$), and processes the commanded shunt angle ($f^*_{shunt}$) through a calibrated flux lookup table 34 ("Flux Command Look Up"). Such a table 34 allows the controller 50 to determine the corresponding d-axis and q-axis flux contributions $Ø_d^*$ and $Ø_q^*$, respectively. The commanded flux contributions $Ø_d^*$ and $Ø_q^*$ are fed into a torque command calculation block 35 ("Torque Command Calculation") along with the d-axis current command $I_d^*$ and the q-axis current command $I_q^*$. The above-noted estimated torque value ($T_{est}$) from the torque estimation block 40 is then subtracted from the commanded torque (arrow T*) and passed through to a proportional-integral (PI) regulator block.

In a possible embodiment, another lookup table 39 ("Flux Actual Look Up") may be indexed by the actual shunt position ($f_{shunt}$) and the respective q-axis and d-axis feedback (fd) control terms/values, i.e., $i_d^*$fd and $i_q^*$fd, which respectively correspond to the d-axis and q-axis current commands described below and shown in FIG. 2. The outputs from lookup table 39 are the actual d-axis and q-axis flux contributions ($φ_d$, $φ_q$) described above, which may be fed into the torque estimation block 40 and used thereby to determine the estimated torque ($T_{est}$), e.g., by extracting the estimated torque from the lookup table. In other embodiments, the torque estimation block 40 may use calibrated equations to derive the estimated torque, and therefore the use of a lookup table for this purpose is merely exemplary.

Still referring to FIG. 2, a delta steady-state current value ($ΔI_{ss}$) is output from the PI regulator and added as an adjustment value to the magnitudes of the q-axis and d-axis currents ($I_d^*$ and $I_q^*$), or $I_d^*$fd and $I_q^*$fd, to thereby derive an error-corrected steady-state current ($I_{SS}$New). This steady-state current ($I_{SS}$New) is then used by an MTPA current command angle lookup table 36 ("MTPA β Angle Look Up") to provide the corresponding current command angle (β) to decouple the $I_{SS}$ command into d-axis and q-axis current commands. A transformation block 37 of the controller 50 receives the β angle and error-corrected steady-state current ($I_{SS}$New), and using the same, outputs adjusted d-axis and q-axis current commands/torque errors, i.e., $I_{d\_adj}^*$ and $I_{q\_adj}^*$, which in turn are used modify the actual d-axis and q-axis current commands, i.e., $I_d^*$ and $I_q^*$, respectively. Error-compensation values $ΔI_d$ and $ΔI_q$ are then passed through a limiter block 24 ("Limiter") to derive corresponding delta commands $ΔI_d^*$ and $ΔI_q^*$, which are added with the outputs of lookup tables 22B ($I_d^*$) and 22C ($I_q^*$) and then fed upstream of the current control block 26 shown in FIG. 1. There, these values are used to calculate the final/actual d-axis and q-axis current commands $I_d^*$ and $I_q^*$ that are ultimately used by the controller 50 to regulate operation of the electric machine 14 in the MTPA control region.

The control strategy whose flow is schematically illustrated in FIG. 2 is tailored for use with a VFM embodiment of the electric machine 14, as noted above. However, with a few simple adjustments, the control logic 50L may be readily extended to use in a PM machine. An example of such an approach is shown in FIG. 4. Referring briefly to FIG. 4, one may substitute a temperature value, such as commanded and actual magnet temperature values (Temp* and Temp_act), for the shunt position values (f*$_{shunt}$ and f$_{shunt}$) shown in FIG. 2. FIGS. 2 and 4 are otherwise identical in both structure and operation. Actual temperature may be estimated or measured.

Using the VFM example, when the shunt angle changes the motor back-EMF will also change, and the corresponding motor torque will be adjusted based on the actual shunt angle. The proposed control method can adjust the current command so that the produced torque is maintained even as the actual shunt angle is changing. For a PM machine, when the motor temperature changes, the motor back-EMF will also change, and the corresponding motor torque will likewise change under the same current command condition. With the proposed control scheme of FIG. 4, the motor output torque will be maintained regardless of the motor temperature change. In this way, the present approach is adaptive to thermal changes in the PM machine.

The control logic 50L of FIG. 2 used for MTPA control in an exemplary VFM embodiment of the electric machine 14 may also be readily extended to a field weakening control region for the same VFM. As shown in FIG. 3, for instance, a modulation index loop/voltage control loop 150L separate from a torque control loop 150T may be used for such a purpose. As will be appreciated by those of ordinary skill in the art, a calculation block 42 and a proportional-integral regulator block (PI) may be used to derive the d-axis feedback adjustment/delta current noted above, i.e., $\Delta I_d^*$.

For instance, the control loop 150L may be used to calculate an adjusted modulation index command ($\Delta MI^*$) as shown and feed the adjusted modulation index command ($\Delta MI^*$) into block 42. As understood in the art and used herein, a modulation index is the ratio of the terminal voltage command of the electric machine 14 divided by the commanded voltage (six-step voltage). Block 42 divides the current DC bus voltage feeding the TPIM 16 of FIG. 1 by the current electrical rotational speed, i.e., Vdc/$\omega_e$, to thereby derive the d-axis delta current $\Delta I_d^*$. Such an approach enables transient torque control to occur in the flux weakening control region. Dual-loop control is utilized in the field weakening control region in which the modulation index loop 150L is used to regulate the d-axis current, and in which the torque control loop, i.e., everything outside of loop 150L in FIG. 3, is used to regulate the q-axis current.

Figure 5:
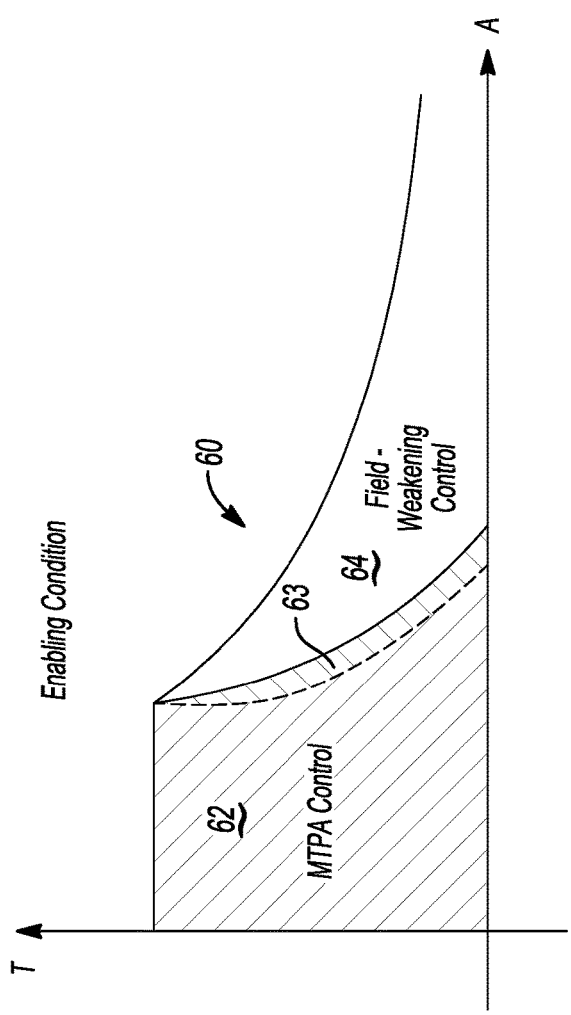
FIGS. 5 and 6 are schematic diagrams of an optional enabling condition and integrator reset logic, respectively, both of which are usable in the MTPA control region.
Figure 6:
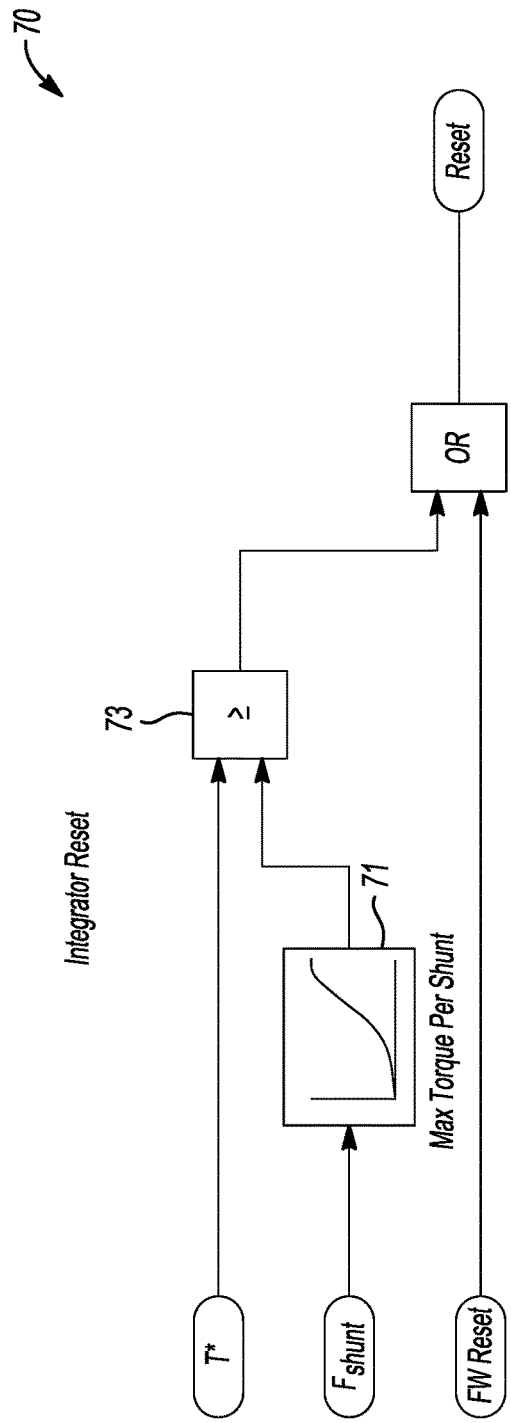

Referring to FIGS. 5 and 6, transient torque control in the MTPA region as set forth above with reference to FIG. 2 may be improved upon using in two manners. In a plot 60 of control regions in FIG. 5, a torque hysteresis band 63 may be implemented between the MTPA control region 62 and the field weakening control region 64. Such an approach may help avoid oscillation or jittering between MPTA control and field weakening control regions and related strategies. Conditions for precisely when to enter or exit the MTPA control region may be based on the current torque command relative to a calibrated threshold. As shown in the exemplary anti-windup logic 70 of FIG. 6, for instance, it would be beneficial to program the controller 50 of FIG. 1 with integrator reset conditions to help avoid saturation of the PI regulator of FIGS. 2-4, for instance when calculated commands cannot be achieved by an actual shunt angle or machine temperature.

For instance, the commanded torque (T*) and actual shunt angle (f$_{shunt}$) may be used as inputs to the anti-windup logic 70, along with a possible forced reset signal (FW Reset), e.g., triggered by a calibrated elapsed time or in response to errors or other suitable conditions. A maximum torque per shunt block 71 may be used to provide a torque value that is compared to the commanded torque (T*) in a comparison block 73 (≥). As long as the maximum torque per shunt from block 71 does not exceed the commanded torque (T*), the PI regulator may continue to integrate and accumulate error. Integrator reset occurs (Reset) when the commanded torque (T*) exceeds the maximum torque per shunt or in response to a forced reset.

As will be appreciated by those of ordinary skill in the art in view of the foregoing disclosure, the present approach contemplates rapid estimation of a commanded torque for the rotary electric machine 14 of FIG. 1 using current and shunt angle commands. Instead of using full torque control of the electric machine 14 during a transient response, a portion of motor torque (arrow $T_M$) is controlled through the feedback loops depicted in the various Figures. The present approach adjusts the d-axis and q-axis current commands to the electric machine 14 based on the commanded and actual shunt angle, with estimated torque from the electric machine 14 likewise provided through the shunt angle and d-axis/q-axis current commands. Thus, the present approach seeks to maintain a smooth torque transient response and torque accuracy during shunt angle transitions occurring within VFM embodiments of the electric machine 14 even in the presence of shunt error, with aspects of the present disclosure readily extendable to thermal adaption for PM machine variants. These and other benefits will be readily appreciated by those of ordinary skill in the art in view of the forgoing disclosure.

The present disclosure thus enables methods for controlling transient operation of the rotary electric machine 14. In an exemplary embodiment, for instance, this may occur during a shunt angle transition during an MTPA control region of the electric machine 14 via the torque control loop 150T of FIG. 3. An embodiment of such a method may include determining the estimated output torque ($T_{est}$) via the torque estimation block 40 using the feedback d-axis and q-axis current commands ($i_d^*$fd and $i_q^*$fd), and an additional value, i.e., the actual shunt angle f$_{shunt}$ or a temperature of the electric machine 14 depending on the configuration of the electric machine 14.

Such a method may include subtracting the estimated torque from the commanded torque T* to derive an adjusted commanded torque value (T*adj), and calculating, from the adjusted commanded torque value, the delta d-axis and delta q-axis current commands $I_{d\_adj}$ and $I_{q\_adj}$. The method may also include adjusting the actual d-axis and q-axis current commands via the controller 50 using the delta d-axis and delta q-axis commands, respectively, to thereby produce the d-axis and q-axis commands $I_d^*$fd and $I_q^*$fd, with the controller 50 thereafter providing the d-axis and q-axis commands as closed-loop feedback (fd) terms to the torque estimation block 40.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What we claim is:

1. A method for controlling transient operation of a rotary electric machine, comprising:
during a maximum torque per ampere (MTPA) control region of the electric machine:
determining an estimated output torque of the electric machine, via a torque estimation block within a torque loop a controller, using a d-axis current command, a q-axis current command, and an additional value, wherein the additional value is an actual shunt angle of the electric machine or a temperature of the electric machine;
subtracting the estimated output torque from a commanded output torque to thereby derive an adjusted commanded torque value or torque error;
calculating, using the adjusted commanded torque value or torque error, a delta d-axis current command and a delta q-axis current command;
adjusting a d-axis current command and a q-axis current command of the electric machine, via the controller, using the delta d-axis current command and the delta q-axis current command, respectively; and
providing the d-axis current command and the q-axis current command to the torque estimation block as closed-loop feedback control terms.

2. The method of claim 1, wherein the rotary electric machine is a variable flux machine in which the transition modifies flux paths within and a back-EMF of the electric machine, and wherein the additional value is the actual shunt angle.

3. The method of claim 1, wherein the electric machine is a permanent magnet machine, and wherein the additional value is the temperature of the electric machine.

4. The method of claim 1, further comprising:
feeding a direct current bus voltage, a torque slew command, and a rotary speed of the electric machine into separate d-axis and q-axis current command lookup tables of the controller; and
adding the delta d-axis current command and the delta q-axis current command to respective outputs of the separate d-axis and q-axis current command lookup tables to thereby derive the d-axis current command and the q-axis current command.

5. The method of claim 1, wherein calculating the delta d-axis current command and the delta q-axis current command includes processing the adjusted commanded torque value or torque error through a proportional-integral (PI) regulator to thereby produce a delta steady-state current magnitude, adding the delta steady-state current magnitude to a steady-state current magnitude to produce a new steady-state current value, processing the new steady-state current value through an MTPA beta angle lookup table to produce a current command beta angle of the electric machine, and transforming the current command beta angle into adjusted d-axis and q-axis values using a transformation block of the controller.

6. The method of claim 5, further comprising: selectively and automatically resetting the PI regulator in response to a predetermined condition.

7. The method of claim 1, further comprising:
during a field weakening control region of the electric machine occurring prior or subsequent to the MTPA control region:
using a modulation index control loop of the controller to regulate the d-axis current command; and
regulating the q-axis current command via the torque control loop of the controller.

8. The method of claim 7, further comprising:
using a calibrated torque hysteresis band to avoid oscillation or jittering between the MTPA control region and the field weakening control region.

9. The method of claim 1, wherein determining the estimated output torque includes using a flux lookup table to determine a d-axis flux contribution and a q-axis flux contribution, and wherein the torque estimation block includes a lookup table indexed by the d-axis current command, the q-axis current command, the d-axis flux contribution, and the q-axis flux contribution.

10. An electric powertrain comprising:
a rotary electric machine having phase windings;
a traction power inverter module (TPIM) connected to the rotary electric machine via the phase windings; and
a controller having:
a current control block connected to the TPIM, configured to receive d-axis and q-axis current commands, and in response to the d-axis and q-axis current commands, to output d-axis and q-axis voltage commands to the TPIM; and
a shunt control block configured to transition an actual shunt angle of the electric machine during a maximum torque per ampere (MTPA) control region of the electric machine to thereby modify flux paths within and back-EMF of the electric machine;
wherein the controller is configured to execute instructions to thereby control a transient operation of the rotary electric machine, and execution of the instructions causes the control system, during the shunt angle transition, to:
determine an estimated output torque of the rotary electric machine, via a torque estimation block, using a d-axis current command, a q-axis current command, and an additional value, wherein the additional value is an actual shunt angle of the electric machine or a temperature of the electric machine;
subtract the estimated output torque from a commanded output torque to thereby derive an adjusted commanded torque value or torque error;
calculate, from the adjusted commanded torque value or torque error, a delta d-axis current command and a delta q-axis current command;
adjust an actual d-axis current command and an actual q-axis current command of the electric machine using the delta d-axis current command and the delta q-axis current command, respectively, to thereby produce the d-axis command and the q-axis command; and
provide the d-axis current command and the q-axis current command as closed-loop feedback control terms to the torque estimation block.

11. The electric powertrain of claim 10, wherein the rotary electric machine is a variable flux machine, and wherein the additional value is the actual shunt angle.

12. The electric powertrain of claim 10, wherein the controller is configured to:
feed a direct current bus voltage, a torque slew command, and a rotary speed of the electric machine into separate d-axis and q-axis current command lookup tables; and
add the delta d-axis current command and the delta q-axis current command to respective outputs of the d-axis and q-axis current command lookup tables to thereby derive the d-axis current command and the q-axis current command.

13. The electric powertrain of claim 10, wherein the controller is configured to:

calculate the delta d-axis current command and the delta q-axis current command by processing the adjusted commanded torque value through a proportional-integral (PI) regulator to thereby produce a delta steady-state current magnitude;

add the delta steady-state current magnitude to a steady-state current magnitude to produce a new steady-state current value;

process the new steady-state current value through an MTPA beta angle lookup table to produce a current command beta angle of the electric machine; and transform the current command beta angle into adjusted d-axis and q-axis values using a transformation block of the controller.

14. The electric powertrain of claim 13, wherein the controller is configured to selectively and automatically reset the PI regulator in response to a predetermined condition.

15. The electric powertrain of claim 13, wherein the controller is configured, during a field weakening control region of the rotary electric machine occurring prior or subsequent to the MTPA control region, to:

use a modulation index control loop or a voltage control loop of the controller to regulate the d-axis current command; and regulate the q-axis current command via the torque control loop of the controller.

16. The electric powertrain of claim 15, wherein the controller is configured to use a calibrated torque hysteresis band to avoid oscillation between the MTPA control region and the field weakening control region.

17. The electric powertrain of claim 13, wherein the controller is configured to determine the estimated output torque of the electric machine by using a flux lookup table to determine a d-axis and a q-axis flux contribution, and wherein the torque estimation block includes a lookup table indexed by the d-axis current command, the q-axis current command, the d-axis flux contribution, and the q-axis flux contribution.

18. The electric powertrain of claim 13, further comprising: a driven load connected to the rotary electric machine.

19. The electric powertrain of claim 18, wherein the driven load includes one or more road wheels of a motor vehicle.

20. The method of claim 1, wherein determining the estimated output torque of the electric machine includes decoupling a steady-state current command into the d-axis current command and the q-axis command.

* * * * *